United States Patent [19]

Date

[11] Patent Number: 5,594,472
[45] Date of Patent: Jan. 14, 1997

[54] CHARACTER DEVELOPING APPARATUS

[75] Inventor: Masahiro Date, Yokohama, Japan

[73] Assignee: Fujitsu Limited, Kanagawa, Japan

[21] Appl. No.: 446,493

[22] Filed: May 22, 1995

[30] Foreign Application Priority Data

May 30, 1994 [JP] Japan .................................. 6-139344

[51] Int. Cl.⁶ ........................................................ G06K 9/00
[52] U.S. Cl. ............................................ 345/194; 345/189
[58] Field of Search ..................................... 345/194, 195, 345/202, 127, 128, 129, 130, 189; 382/190, 199, 209, 224; 358/429, 454, 456, 457, 458, 459, 460, 463

[56] References Cited

U.S. PATENT DOCUMENTS

| | | | |
|---|---|---|---|
| 3,999,167 | 12/1976 | Ito et al. | 345/129 |
| 4,603,330 | 7/1986 | Horne et al. | 345/195 |
| 4,630,039 | 12/1986 | Shimada | 345/130 |
| 4,827,254 | 5/1989 | Nishiyama | 345/195 |
| 5,276,790 | 1/1994 | Lo et al. | 395/142 |
| 5,303,334 | 4/1994 | Snyder et al. | 395/109 |

FOREIGN PATENT DOCUMENTS 4-265767  9/1992  Japan .................................. B41J 5/30

*Primary Examiner*—Leo Boudreau
*Assistant Examiner*—Bijan Tadayon

[57] ABSTRACT

A character developing apparatus for converting a character string in which outline characters and non-outline characters are mixed into character patterns, and developing the character patterns on a bitmap memory. The character developing apparatus includes a character storage memory for storing the character pattern, a character transfer circuit for selecting the character pattern corresponding to the character code from the character storage memory and transferring the selected character pattern to the bitmap memory. An outline memory stores outline data of the character and a character forming circuit executes outline character extraction processing of consecutively extracting the outline character requiring the character pattern from the character code and character forming processing of consecutively forming the character pattern of the outline character in the character storage memory by use of the outline data in the outline memory. The character forming circuit includes a plurality of pipeline-connected processing circuits each taking charge of divided processes containing the character extraction processing and character forming processing. A time of development on the bitmap memory is thereby reduced.

7 Claims, 20 Drawing Sheets

FIG. 7

| CHARACTER TRANSFER POINTER | OUTLINE CHARACTER FORMING POINTER | NUMBER OF CHARACTERS | CHARACTER MANAGEMENT TABLE POINTER | BMM ADDRESS | CHARACTER MANAGEMENT TABLE POINTER | BMM ADDRESS | CHARACTER MANAGEMENT TABLE POINTER | ... |

CHARACTER STRING CREATION DATA

DATA FOR ONE CHARACTER

FIG. 8

| CHARACTER STRING ORDER CODE | LENGTH | START-OF-CHARACTER STRING ADDRESS | CHARACTER SIZE X,Y | CHARACTER PITCH | CHARACTER CODE | CHARACTER CODE | CHARACTER CODE | ... |

FIG. 9A
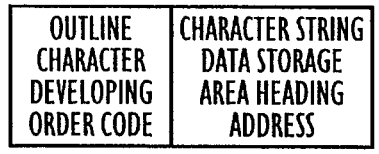
FIG. 9B
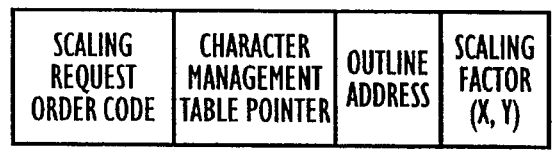
FIG. 9C
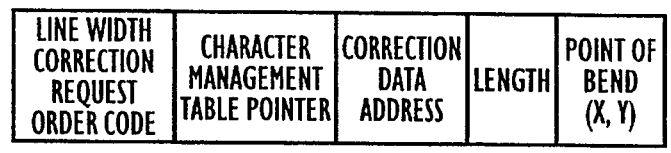
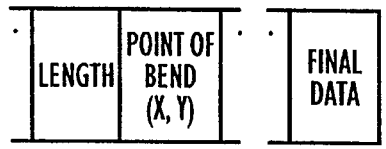
FIG. 9D
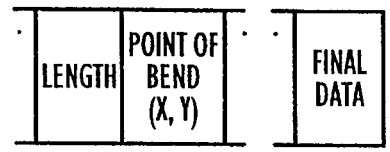

CHARACTER DEVELOPING APPARATUS

BACKGROUND OF THE INVENTION

1. Field of the Invention

The present invention relates generally to a character developing apparatus for developing an outline character in a character string on a bitmap memory and, more particularly, to a character developing apparatus including an outline character forming circuit constructed of a plurality of pipeline-connected processing circuits.

2. Description of the Related Art

An outline character forming method has been utilized, wherein a character pattern is formed from data (outline data) indicating a character outline in order to form the character pattern of kanji (Chinese character), etc. According to such an outline character forming method, there are proposed pipeline processing circuits for the purpose of reducing an outline character creation processing time, wherein outline character creation processing is divided into a plurality of processes, and the independent processing circuit each takes charge of the divided process.

In the outline character creation (forming) circuit employing such pipeline processing circuits, a technology of sufficiently exhibiting a function of the pipeline is desired.

FIGS. 21 and 22 are explanatory diagrams showing the prior art.

As illustrated in FIG. 21, a character developing apparatus includes a control CPU (central processing unit) 90, an outline character forming circuit 91, a character storage memory 92, a character transfer circuit 93, a bitmap memory 94 and a control memory 95.

The control CPU 90, on receiving a to-be-developed character string containing the outline characters, processes character codes of the character string in sequence. This character storage memory 92 stores the developed character patterns (the character pattern developed from outline data and the character patterns originally developed as character patterns) and also outline data of the characters.

Supposing that the characters of the character string are defined as characters (non-outline characters) developed in the form of the character patterns, the character transfer circuit 93 transfers the relevant character pattern to the bitmap memory 94 from the character storage memory 92. On the other hand, if the characters of the character string are defined as outline characters that are not developed into the character patterns, the outline character forming circuit 91 is started up. The outline character forming circuit 91 creates the character patterns by use of the outline data in the character storage memory 92. Then, the character transfer circuit 93 transfers the thus formed character patterns to the bitmap memory 94.

An explanation will be given referring to FIG. 22. First through fourth characters [A]–[D] in the character string are defined as non-outline characters. With respect to these characters, the character storage memory 92 stores the character patterns, and therefore the character patterns are transferred from the character storage memory 92. On the other hand, a fifth character [E] is an outline character. The character storage memory 92 stores no character pattern with respect to the outline character. For this reason, a character pattern is, after being created by the outline character forming circuit 91, transferred to the bitmap memory 94.

As illustrated in FIG. 22, forming this outline character involves initial processing, a change of a character size, a correction of a line width, rendering an outline and filling within the outline. For performing these processes within a short period of time, the outline character forming circuit 91 makes use of pipeline processing circuits, wherein each processing is conducted by a dedicated processing circuit.

Based on the prior art, however, the character strings are processed in sequence, and, hence, there exists a necessity for waiting a time for forming the outline character. For this reason, if the characters (non-outline characters) with the already-formed character patterns and the outline characters are so arranged as to be mixed in the character string, this conduces to a problem in which the character can not be developed at a high speed.

SUMMARY OF THE INVENTION

It is a primary object of the present invention to provide a character developing apparatus for developing character patterns of a character string in which outline characters and non-outline characters are mixed at a high speed.

It is another object of the present invention to provide a character developing apparatus for making effective use of a pipeline character forming circuit.

A character developing apparatus according to the present invention converts a character string in which outline characters and non-outline characters are mixed into character patterns and develops the character patterns on a bitmap memory. The character developing apparatus includes a character storage memory for storing the character pattern, a character transfer circuit for selecting the character pattern corresponding to the character code from the character storage memory and transferring the selected character pattern to the bitmap memory. The apparatus further includes an outline memory for storing outline data of the character and a character forming circuit for executing outline character extraction processing of consecutively extracting the outline character requiring a formation of the character pattern from the character code and character forming processing of consecutively forming the character pattern of the outline character in the character storage memory by use of the outline data in the outline memory. The character forming circuit includes a plurality of pipeline-connected processing circuits individually taking charge of divided processes containing the character extraction processing and character forming processing.

According to the present invention, the pipeline circuit capable of performing consecutive processing is effectively employed, and the outline characters are thereby batch-processed consecutively. According to this invention, the outline character forming circuit extracts only the outline characters and batch-processes these characters consecutively, thereby speeding up the forming of the characters in the character string.

Other features and advantages of the present invention will become readily apparent from the following description taken in conjunction with the accompanying drawings.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principle of the invention, in which:

FIG. 7 is an explanatory diagram of character string data in the embodiment of FIG. 2;

FIG. 8 is an explanatory diagram of a character string in the embodiment of FIG. 2;

FIG. 9A is an explanatory diagram of an outline character development request in the embodiment of FIG. 2; FIG. 9B is an explanatory diagram of a scaling request in the embodiment of FIG. 2; FIG. 9C is an explanatory diagram of a line width correction request in the embodiment of FIG. 2; FIG. 9D is an explanatory diagram of an outline render request in the embodiment of FIG. 2;

DESCRIPTION OF THE PREFERRED EMBODIMENTS

Figure 1:
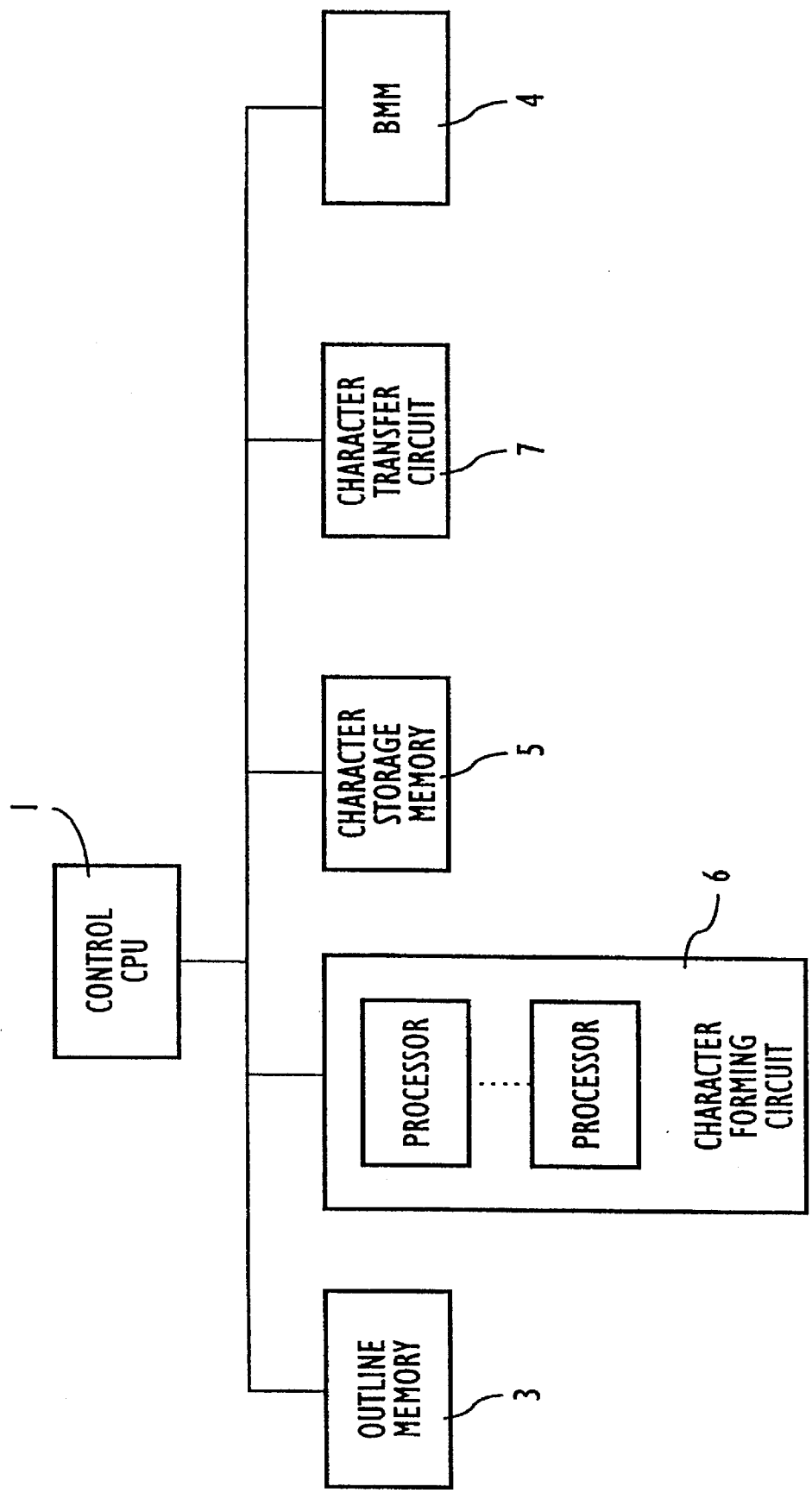
FIG. 1 is a diagram showing the principle of the present invention.

FIG. 1 is a diagram showing the principle of the present invention.

As illustrated in FIG. 1, a character pattern is developed on a bitmap memory 4. An outline memory 3 stores outline data of respective characters. A character storage memory 5 holds the character patterns. A character transfer circuit 7 transfers the character pattern of the character storage memory 5 to the bitmap memory 4.

An outline character forming circuit 6 is constructed of a plurality of processing circuits connected in series. This outline character forming circuit 6 performs character extraction processing of consecutively extracting outline characters in a character string. Further, this outline character forming circuit 6 executes the character formation processing of forming the character pattern in the character storage memory 3. Then, the plurality of above-mentioned processing circuits respectively take charge of the divided processes including character extraction processing and the character formation processing.

Further, a control circuit 1 starts up this character transfer circuit 7 and the outline character forming circuit 6.

Figure 2:
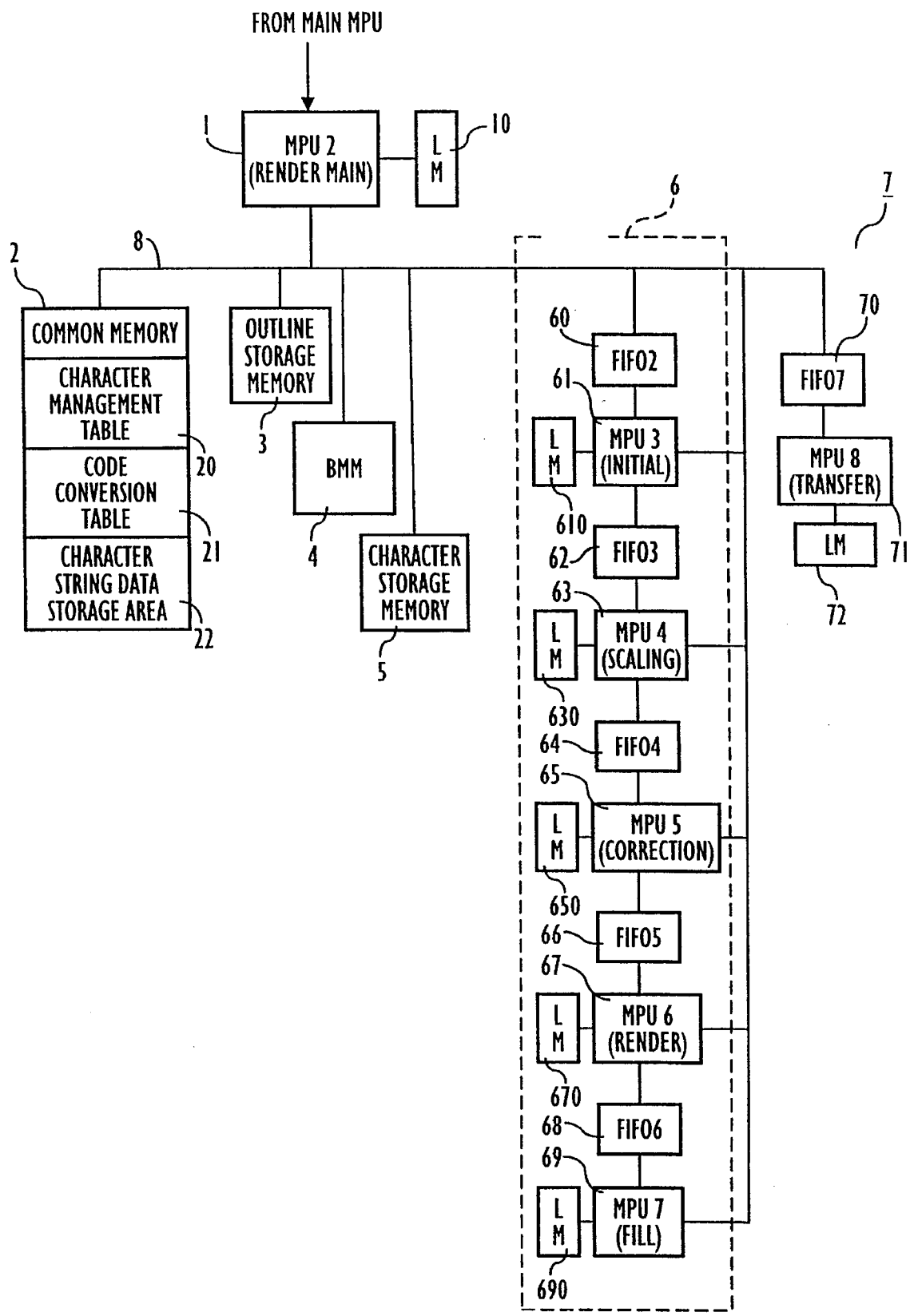
FIG. 2 is a block diagram illustrating one embodiment of the present invention.
Figure 3B:
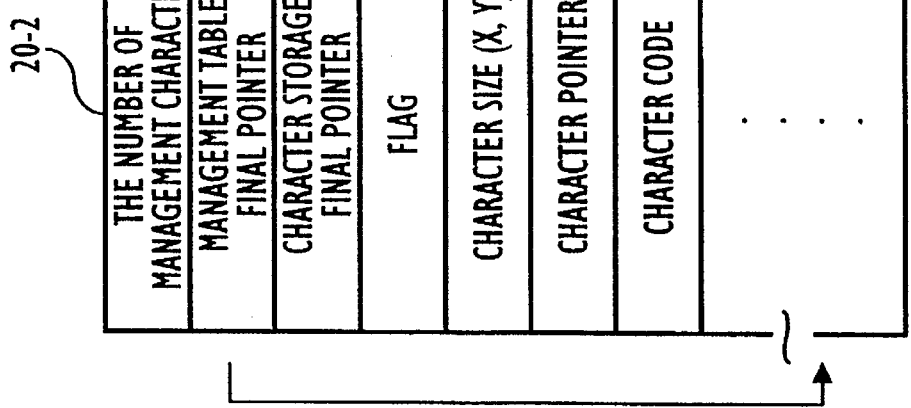
FIGS. 3A and 3B are diagrams each illustrating a structure of a character management table of FIG. 2.
Figure 3A:
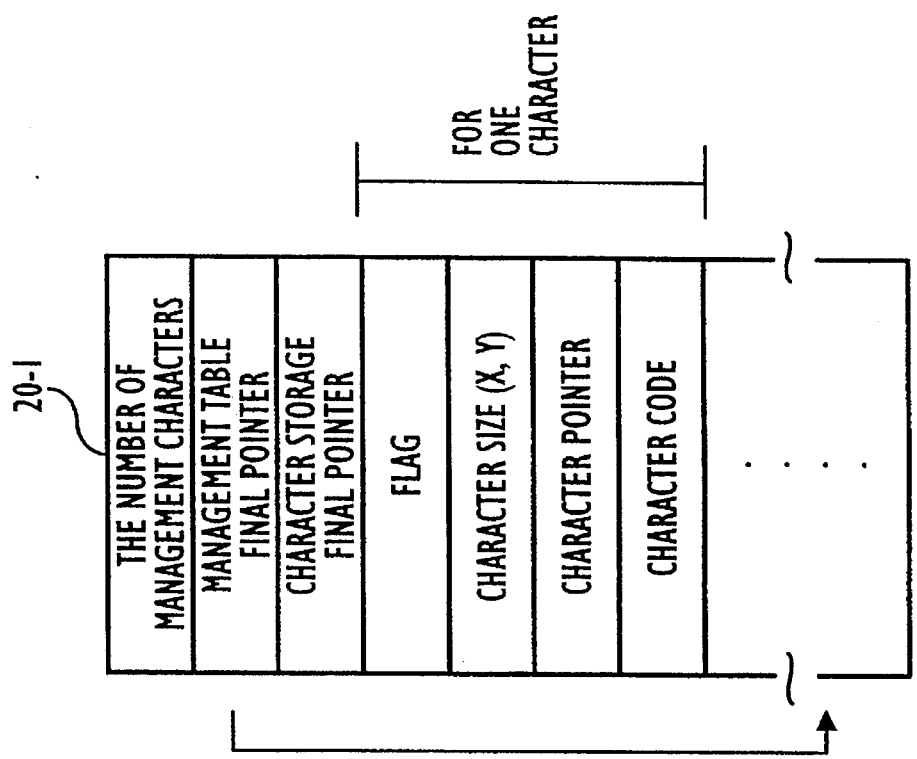
Figure 5:
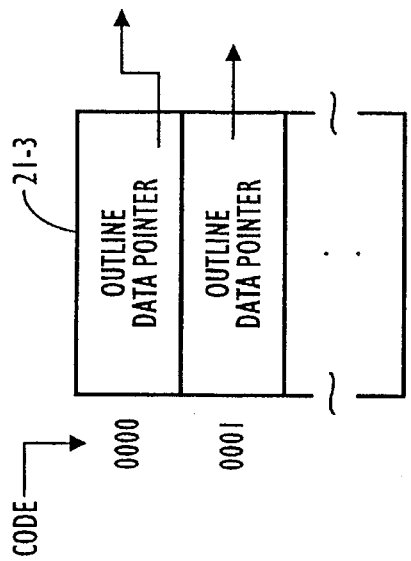
FIG. 5 is a diagram (Part 2) showing a structure of the code conversion table of FIG. 2.
Figure 4B:
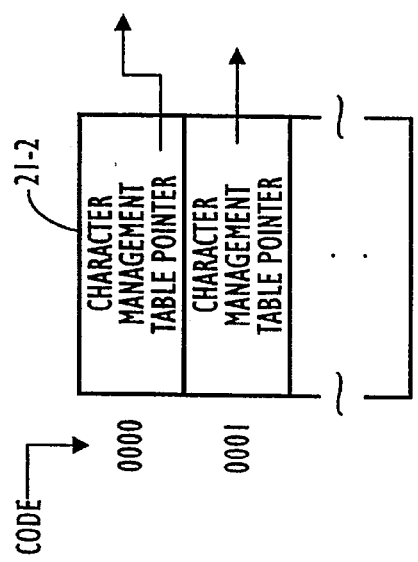
FIGS. 4A and 4B are diagrams (Part 1) each showing a structure of a code conversion table of FIG. 2.
Figure 4A:
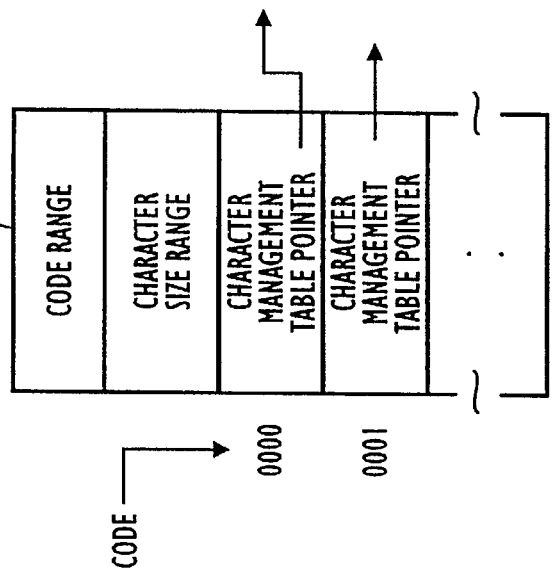
Figure 6:
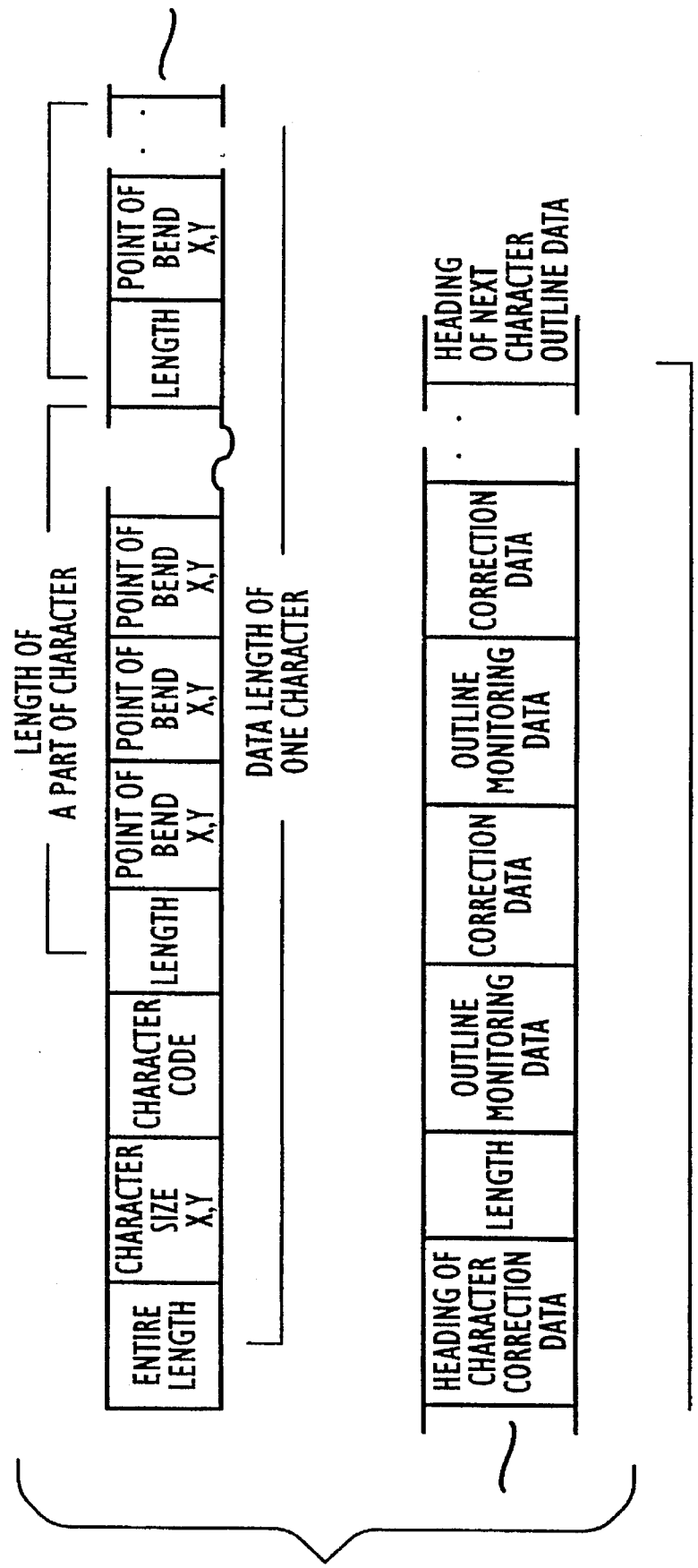
FIG. 6 is a diagram showing a structure of an outline storage memory of FIG. 2.

FIG. 2 is a block diagram illustrating one embodiment of the present invention. FIGS. 3A and 3B are diagrams each showing a structure of a character management table of FIG. 2. FIGS. 4A, 4B and 5 are diagrams each showing a structure of a code conversion table of FIG. 2. FIG. 6 is a diagram illustrating a structure of the outline storage memory. FIG. 7 is a diagram of assistance in explaining character string data. FIG. 8 is a diagram of assistance in explaining the character string. FIGS. 9A, 9B, 9C, 9D, 10A and 10B are explanatory diagrams of each processing request.

As illustrated in FIG. 2, a render main processor (control circuit) 1 receives the character string transmitted from an unillustrated main processor according to processes of FIGS. 11 and 12 which will be mentioned later and creates character string data from this character string. As shown in FIG. 8, this character string consists of a character string order code, a length of the whole character string, a start-of-character-string address, a character size, a character pitch and character codes of the respective characters.

As illustrated in FIG. 7, the character string data to be created is constructed of a character transfer pointer for indicating the number of characters transferred, an outline character forming pointer used by the outline character forming circuit 6, the number of the entire characters, character management table pointers for each character and a to-be-developed address of the bitmap memory 4. Note that a local memory 10 is connected to the render main processor 1 in order to effect creation processing thereof.

As shown in FIG. 2, a common memory 2 has a character management table 20, a code conversion table 21 and a character string data storage area 22. The character management table 20 stores an item of management data of the character storage memory 5.

The character storage memory 5 is constructed of a raster area for storing pre-formed character patterns (referred to as a raster character) and an outline cache area for storing the character patterns formed from the outline data. Therefore, the character management table 20 includes a character management table 20-1 (see FIG. 3A) for the raster area and a character management table 20-2 (see FIG. 3B) for the outline cache area.

As illustrated in FIGS. 3A and 3B, each of the character management tables 20-1, 20-2 comprises a number-of-management-characters which indicates the number of characters registered in the character management table 20, a management table final pointer for indicating a position registered next in the character management table 20, a character storage final pointer for indicating a pointer stored next in the character storage memory 5 and management data of each character. The management data of each character includes a flag ([0] when not yet formed but [1] when already formed) for indicating whether or not the character pattern has been already formed, a storage character size, a pointer for the character on the character storage memory 5 and a character code.

The code conversion table 21 shown in FIG. 2, as illustrated in FIGS. 4A, 4B and 5, serves to convert the character code into the character management table pointer or the pointer for the outline data in the outline memory 3. This code conversion table 21 includes a raster oriented code conversion table 21-1 (see FIG. 4A), an outline cache oriented code conversion table 21-2 (see FIG. 4B) and an outline memory oriented code conversion table 21-3 (see FIG. 5).

As depicted in FIG. 4A, the rater oriented code conversion table 21-1 has a code range for indicating a code range of the raster character to be accommodated, a character size range of the raster character to be accommodated and character management table pointers with respect to the character codes for the individual raster characters.

As illustrated in FIG. 4B, the outline cache oriented code conversion table 21-2 has character management table pointer with respect to the character codes for the individual outline cache characters.

As shown in FIG. 5, the outline memory oriented code conversion table 21-3 has pointers for the outline data in the outline memory 3 with respect to the individual character codes.

Referring back to FIG. 2, the outline memory 3 stores the outline data of the respective characters. As illustrated in FIG. 6, the outline data contains an entire length of each character, a character size of each character, an item of data of respective portions constituting the character and an item of correction data for enhancing the quality. This item of character constituting portion data consists of a length of the portion and a point-of-bend coordinate value.

Referring again back to FIG. 2, the bitmap memory 4 is a memory on which the character pattern is developed. The outline character forming circuit 6 includes five pieces of processors 61, 63, 65, 67, 69 connected respectively through FIFO memories 60, 62, 64, 66, 68. The individual processors 61, 63, 65, 67, 69 have local memories 610, 630, 650, 670, 690 for processing thereof. Accordingly, the processors 61, 63, 65, 67, 69 of the outline character forming circuit 6 are pipeline-connected to take charge of the divided outline creation processing.

The processor 61 serves to perform initial processing. This processor 61 searches the character string data in the character string data storage area 22 of the common memory 2 in accordance with an outline character development request given from the render processor 1 shown in FIG. 9A and detects such an outline character that the character pattern is formed from the outline data. This outline character developing request is composed of an outline character developing order code and a heading address of a character string data storage area.

Then, the processor 61 outputs a scaling request shown in FIG. 9B to a scaling oriented processor 63 of the next stage. The scaling request is composed of a scaling request order code, a character management table pointer of a target character, an address of the outline data in the outline memory 3 and a scaling factor (X, Y).

The scaling oriented processor 63 performs scaling of a point of bend of the target character in accordance with a scaling request shown in FIG. 9B. That is, a point-of-bend coordinate value of a corresponding item of outline data (see FIG. 6) of the outline storage memory 3 is taken out based on an outline address in a scaling request. Calculated next is a point of bend undergoing the scaling through a multiplication of the point-of-bend coordinate value of this item of outline data by the scaling factor.

Then, the scaling oriented processor 63 outputs a line width correction request shown in FIG. 9C to a correction processor 65 of the next stage. The line width correction request is composed of a character management table pointer of the target character, a correction data address in the outline storage memory 3, a data length of each portion of one character and each point-of-bend coordinate value undergoing the scaling.

The correction processor 65 executes known line width correction processing in accordance with the correction request shown in FIG. 9C. That is, the corresponding correction data (see FIG. 6) of the outline storage memory 3 is taken out of the correction data address of the line width correction request. Next, the given point-of-bend coordinate value is subjected to a line width correction on the basis of the correction data.

Then, the correction processor 65 outputs an outline render request shown in FIG. 9D to an outline render processor 67. The outline render request is composed of an outline render request order code, a character management table pointer of the target character, a data length of each portion of one character and each point-of-bend coordinate value undergoing the line width correction.

The outline render processor 67 renders an outline in accordance with the outline render request shown in FIG. 9D. That is, the processor 67 renders the outline on the basis of the point-of-bend coordinate value given from the correction processor 65. At this time, the outline render processor 67 obtains a character storage location of the character storage memory 5 from the character management table pointer and renders the outline in this location of the character storage memory 5.

Figure 10A:
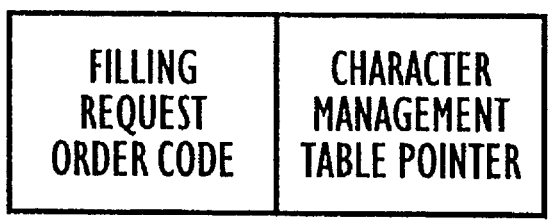
FIG. 10A is an explanatory diagram of a filling request in the embodiment of FIG. 2.

Then, the outline render processor 67 outputs a filling request shown in FIG. 10A to a filling processor 69 of the next stage. The filling request is composed of a filling request order code and a character management table pointer of the target character.

The filling processor 69 executes the fill processing in accordance with the filling request shown in FIG. 10A. That is, the filling processor 69 obtains a character storage location of the character storage memory 5 and fills an area within the outline in that location of the character storage memory 5.

Turning back to FIG. 2, a character transfer circuit 7 includes a FIFO memory 70, a character transfer processor 71 and a local memory 72. The character transfer processor 71, on receiving a character transfer request from the render main processor 1, executes a character transfer operation.

Figure 10B:
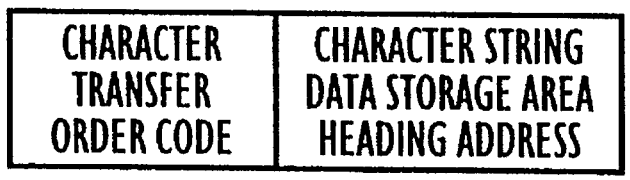
FIG. 10B is an explanatory diagram of a character transfer request in the embodiment of FIG. 2.

The character transfer request is, as illustrated in FIG. 10B, composed of a character transfer request order code and a heading address of the character string data storage area. The character transfer processor 71 searches the character string data of the common memory 2 from the heading address of the character data storage area. Then, the character transfer processor 71 transfers a character pattern in the character storage location of the character storage memory 5 which is indicated by each character management table pointer of the character string data to a location indicated by the character string data of the bitmap memory 4.

A bus 8 serves to connect the render main processor 1 to the common memory 8, the outline storage memory 3, the bitmap memory 4, the character storage memory 5, the outline character forming circuit 6 and the character transfer circuit 7. The respective processors 61, 63, 65, 67, 69 of the outline character forming circuit 6 are connected to the bus 8.

Figure 11:
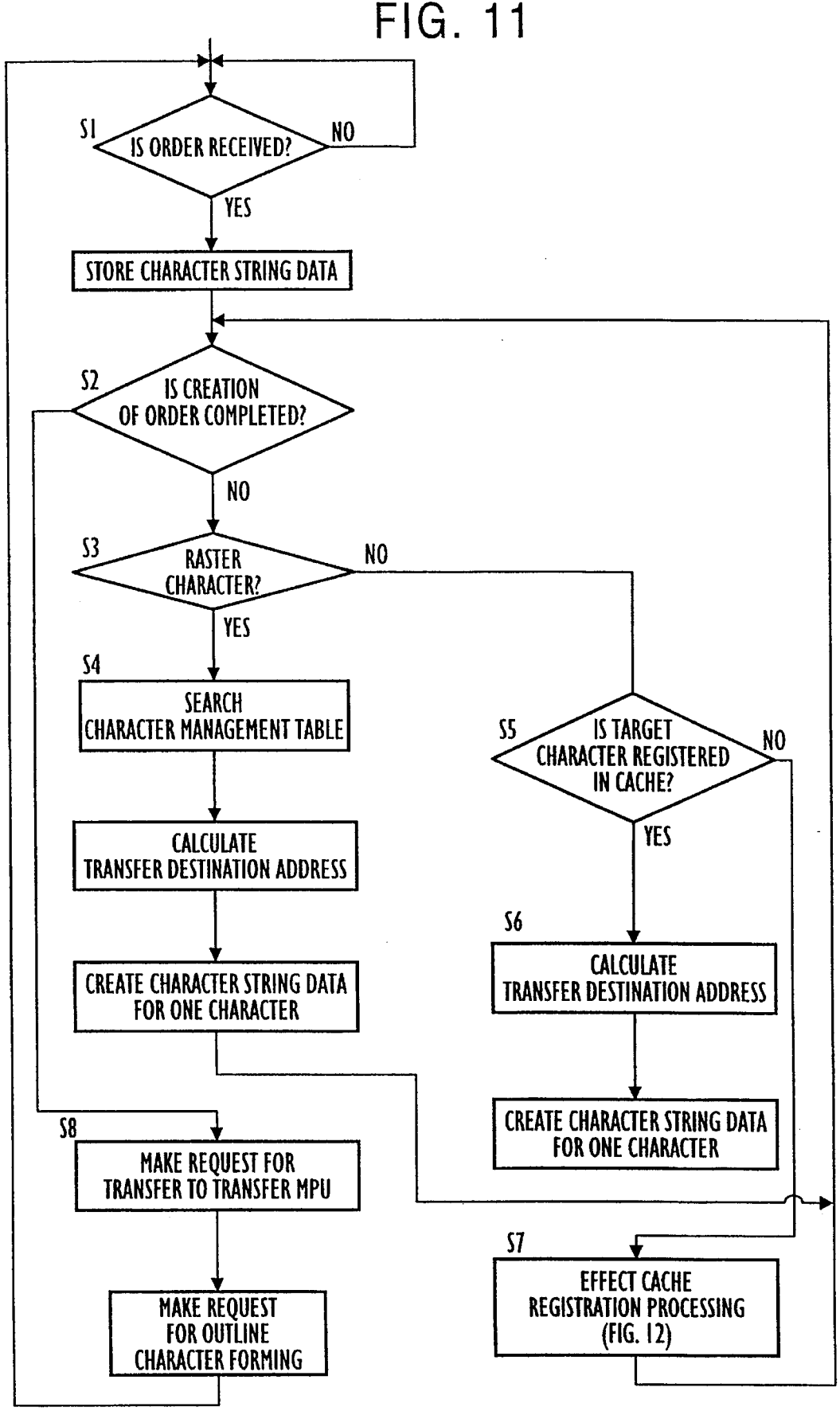
FIG. 11 is a flowchart showing the processing by a render main processor in the embodiment of FIG. 2.
Figure 12:
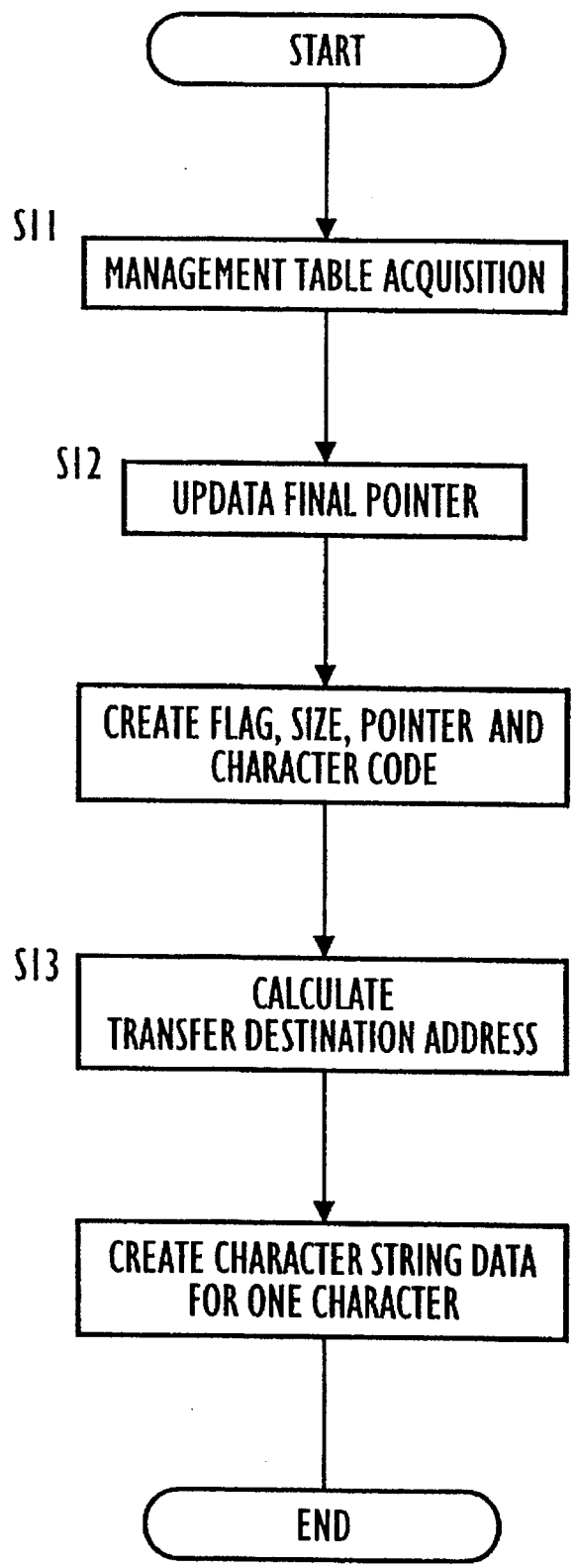
FIG. 12 is a flowchart showing a cache registration in the processing of FIG. 11.

FIG. 11 is a flowchart showing the processing by the render main processor. FIG. 12 is a flowchart showing cache register processing of FIG. 11.

(S1) The render main processor 1 checks whether or not an order (character string) is received from the unillustrated main processor. The character string is shown in FIG. 8. The render main processor 1, on receiving the character string, stores the local memory 10 with this character string.

(S2) Next, the render main processor 1 starts creating a character string order (character string data). To begin with, the render main processor 1 determines whether or not the creation of the character string order is completed.

(S3) The render main processor 1, when determining that the creation of the character string order is not yet completed, compares the character code with the code range of the raster oriented code conversion table 21-1 (see FIG. 4A). Then, the render main processor 1 compares the character size shown in FIG. 8 with the character size range of the raster oriented code conversion table 21-1.

(S4) The render main processor 1, if the character code and the character size coincide therewith as a result of this comparison, determines that the target character is a raster character registered in the character storage memory 5. Then, the render main processor 1 obtains a pointer of the raster oriented character management table 20-1 (see FIG. 3A) from the raster oriented code conversion table 21-1. Subsequently, the render main processor 1 searches the raster oriented character management table 20-1 by this pointer and takes out the character size and the character code as well. The thus taken-out character size and character code are compared with the above-mentioned character size and character code of the character string, thus making a confirmation.

Next, the render main processor 1 calculates a character transfer destination address (BMM address) of the bitmap memory 4 by use of a start address (start-of-character-string address), a bitmap address and a character pitch that are shown in FIG. 8.

Further, the render main processor 1, as illustrated in FIG. 7, creates an item of character string data for one character which consists of the character management table address (pointer) and the BMM address. Then, the render main processor 1 stores the character string data storage area of the common memory 2 with the character string data, and the processing returns to step S2.

(S5) In step S3, the render main processor 1, when determining that the target character is not a registered raster character, determines whether or not the target character has been already registered in the outline cache area of the character storage memory 5. Therefore, the render main processor 1 determines whether or not there exists a pointer to a character management table of the corresponding character code by searching the outline oriented code conversion table 21-2 (see FIG. 4A). If no pointer to a character management table exists, this implies that the target character is not yet registered in the cache area.

Whereas if the pointer to the character management table exists, the cache oriented character management table 20-2 is searched by this pointer, thus taking out the character size and the character code. The taken-out character size and character code are compared with the character size and the character code of the character string, thus making the confirmation. Herein, if different in terms of the character size, this leads to a determination that the target character is not yet registered in the cache area.

(S6) The render main processor 1, if the character code and the character size coincide therewith as a result of this comparison, determines that the target character has been already registered in the cache area. Next, the render main processor 1 calculates the character transfer destination address (BMM address) of the bitmap memory 4 by use of the start address (start-of-character-string address), the bitmap address and the character pitch that are shown in FIG. 8.

Further, the render main processor 1, as illustrated in FIG. 7, creates the character string data for one character which consists of the character management table address (pointer) and the BMM address. Then, the render main processor 1 stores the character string data storage area of the common memory 2 with the character string data, and the processing returns to step S2.

(S7) On the other hand, in step S5, the render main processor 1, when determining that the target character is not yet registered in the cache area, executes cache registration processing which will be mentioned later in FIG. 12. Then, the processing goes back to step S2.

(S8) In step S2, the render main processor 1, when determining that the creation of the character string order is completed, outputs a transfer request (see FIG. 10B) to the transfer processor 71 and starts up this processor 71. With this processing, the render main processor 1 outputs an outline character developing request (see FIG. 9A) to the outline character forming circuit 6 and starts up this circuit 6. Then, the processing returns to step S1.

The cache registration processing will be explained with reference to FIG. 12.

(S11) The render main processor 1 searches empty areas of the character storage memory 5, referring to the final pointer of the cache oriented character management table 20-2 (see FIG. 3B) on the occasion of performing a cache registration. If there are empty areas, the render main processor 1 acquires one character area of the cache oriented character management table 20-2 among the empty areas.

(S12) Next, the render main processor 1 updates the final pointer of the cache oriented character management table 20-2. Then, the render main processor 1 creates a flag indicating the not-yet-created status, a character size, a pointer to the character storage memory 5 and a character code are created in one acquired character area of the cache oriented character management table 20-2. Further, the render main processor 1 sets a pointer to the character management table in the cache oriented code conversion table 21-2, corresponding to the character code.

(S13) The render main processor 1 calculates the character transfer destination address (BMM address) of the bitmap memory 4 by use of the start address (start-of-character-string address), the bitmap address and the character pitch that are shown in FIG. 8.

Further, the render main processor 1, as illustrated in FIG. 7, creates the character string data for one character which consists of the character management table address (pointer) and the BMM address. Then, the render main processor 1 stores the character string data storage area of the common memory 2 with this item of character string data, and the cache registration processing is finished.

Figure 13:
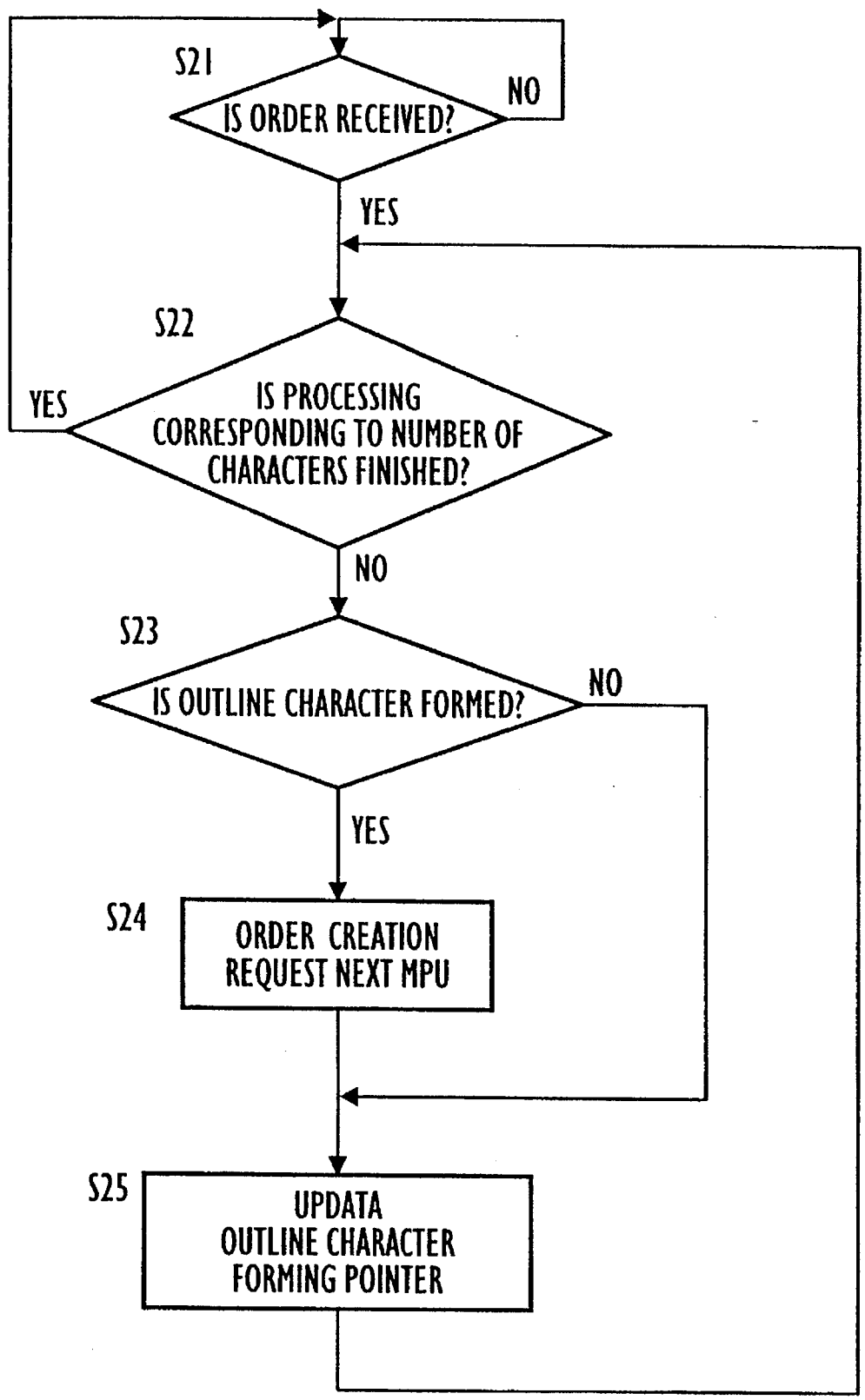
FIG. 13 is a flowchart showing initial processing in the embodiment of FIG. 2.
Figure 14:
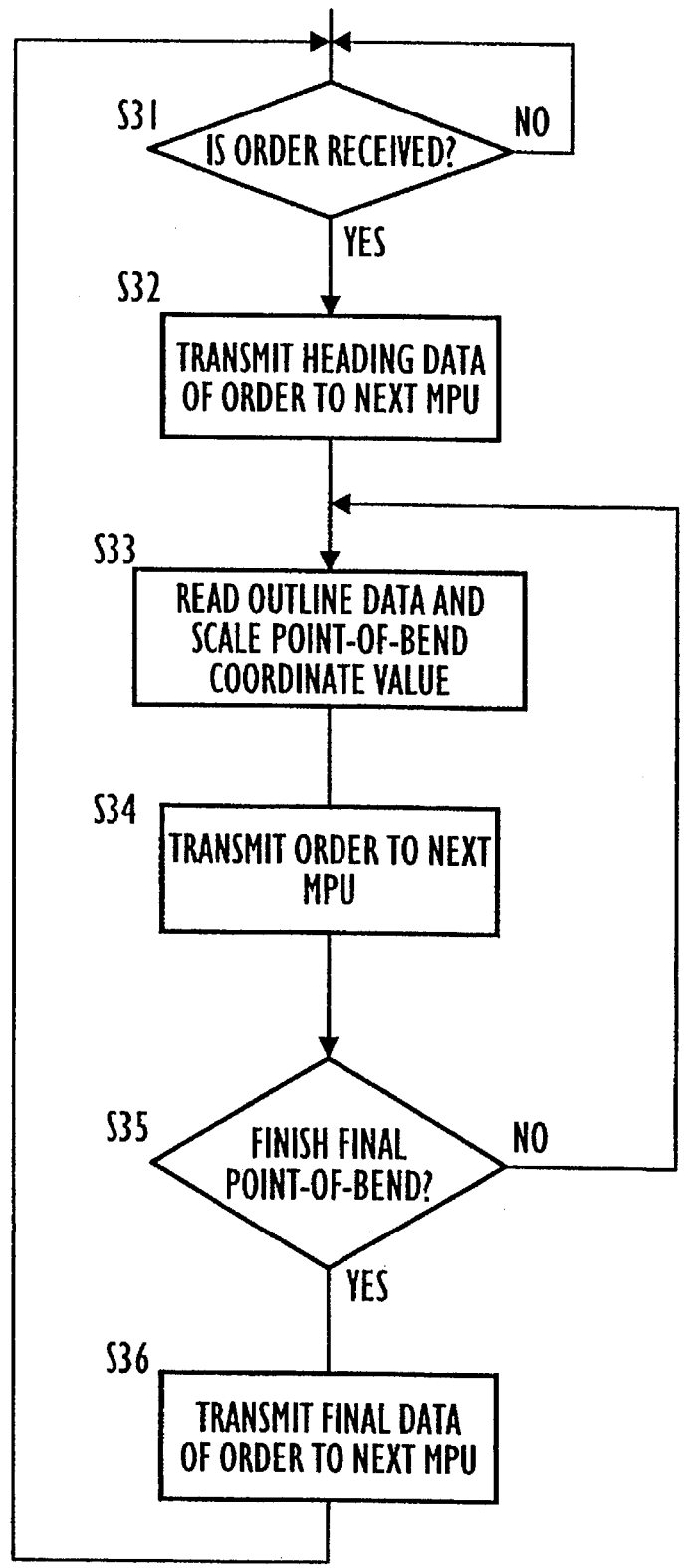
FIG. 14 is a flowchart of scaling processing in the embodiment of FIG. 2.
Figure 15:
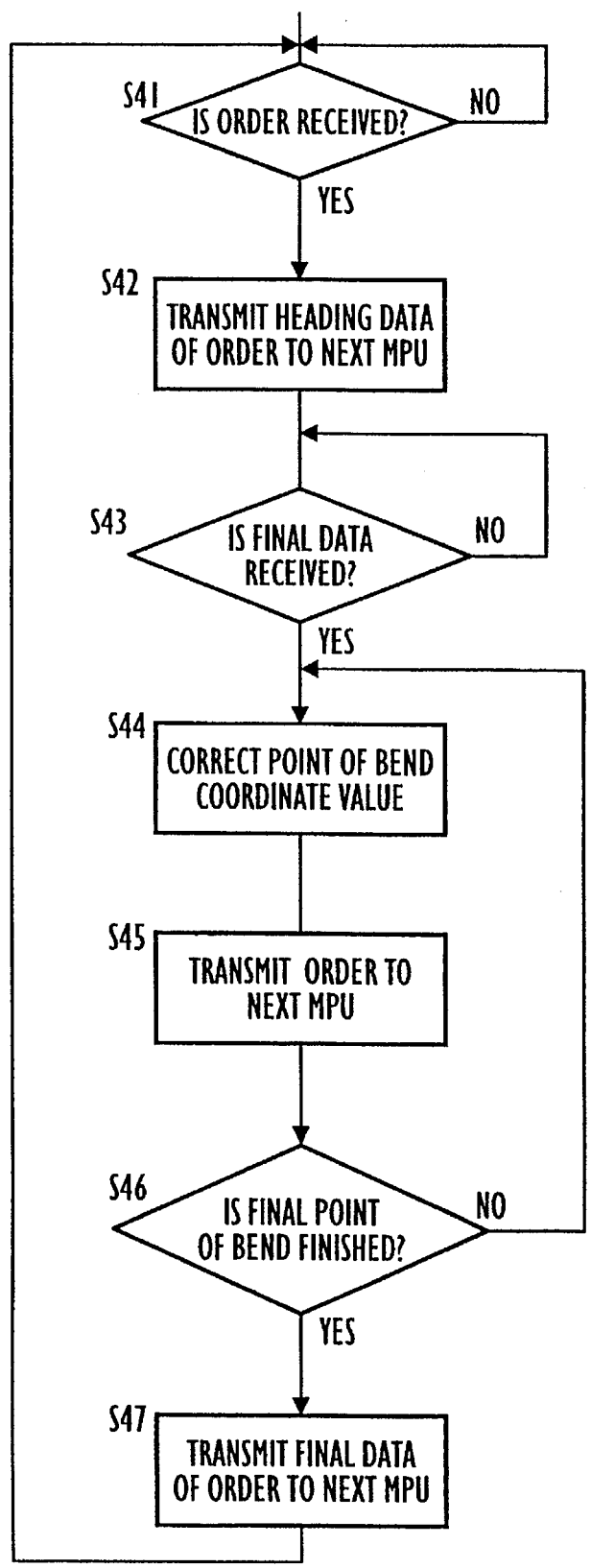
FIG. 15 is a flowchart showing line width correction processing in the embodiment of FIG. 2.
Figure 16:
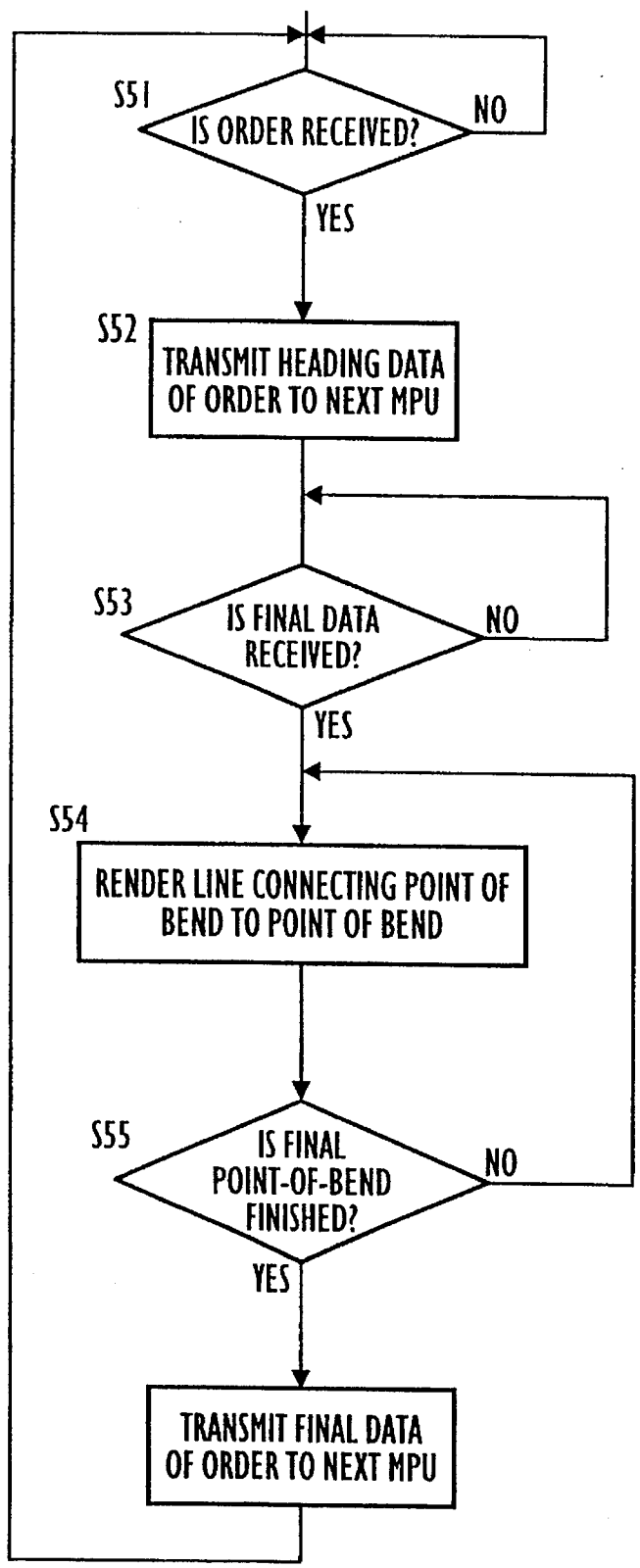
FIG. 16 is a flowchart showing outline render processing in the embodiment of FIG. 2.
Figure 17:
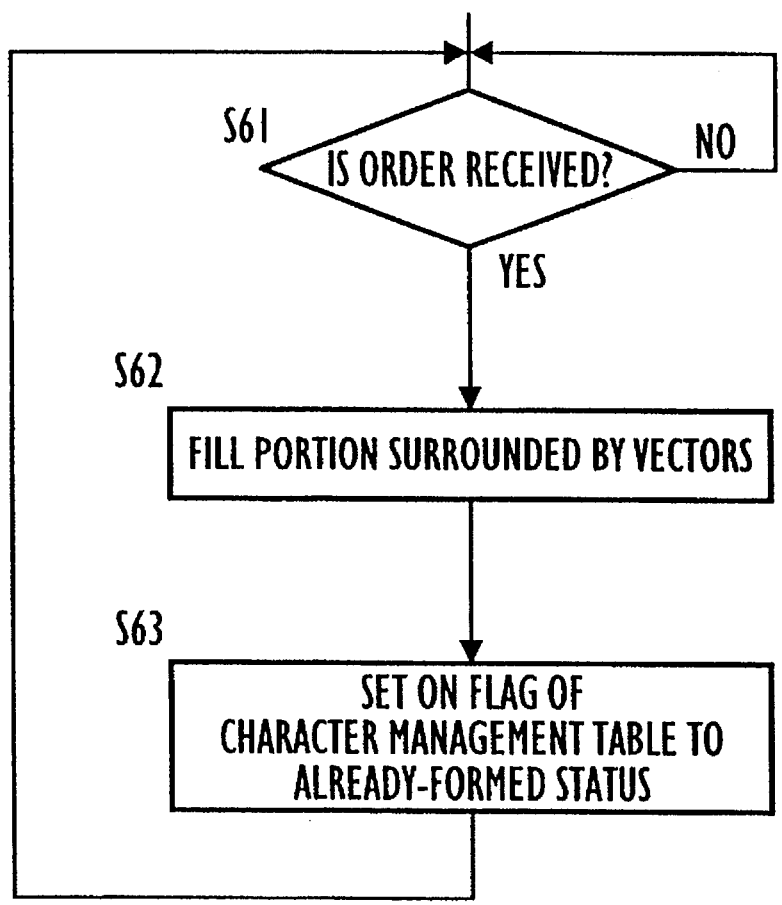
FIG. 17 is a flowchart showing filling processing in the embodiment of FIG. 2.

Next, outline character forming processing will be discussed. FIG. 13 is a flowchart showing the initial processing thereof. FIG. 14 is a flowchart of the scaling processing thereof. FIG. 15 is a flowchart showing the line width correction processing thereof. FIG. 16 is a flowchart showing the outline render processing thereof. FIG. 17 is a flowchart showing the fill processing thereof.

The initial processing will be explained with reference to FIG. 13.

(S21) The processor 61 for the initial processing checks whether or not an outline character forming request (order) shown in FIG. 9A reaches the FIFO memory 60.

(S22) The initial processing processor 61, when determining that the outline character forming request reaches the FIFO memory 60, accesses the character string data storage area of the common memory 2 from the character string data storage area address of this outline character forming request, thus obtaining the character string data. Then, the processor 61 creates a scaling request order shown in FIG. 9A from this item of character string data (see FIG. 7). First, the initial processing processor 61 compares the number of characters with the outline character forming pointer of the character string data and thereby determines whether the order creation processing corresponding to the number of characters has been finished or not. When finishing the order creation processing corresponding to the number of characters, the processing returns to step S21.

(S23) The initial processing processor 61, if the order creation processing corresponding to the number of characters is not yet finished, examines a corresponding character area flag by accessing the character management tables 20-1, 20-2 from the character management table pointer of the character data. If this flag indicates the not-yet-created status, the target character is defined as an outline character requiring a formation of the character pattern.

(S24) The initial processing processor 61, when detecting the outline character requiring the formation of the outline character, creates the scaling request order shown in FIG. 9B. That is, the processor 61 creates the scaling request order consisting of the scaling request order code, the character management table pointer of that character, the outline address and the scaling factor. Note that the outline address is obtained by making use of the outline oriented code conversion table 21-3 (see FIG. 5).

This scaling request order is outputted to the FIFO memory 62 of the next stage in the pipeline.

(S25) In step S23, if the target character is not the outline character, or if outputting the scaling request order in step S24 is finished, the initial processing processor 61 updates the outline character creation pointer of the character string data of FIG. 7. Then, the processing returns to step S22.

Thus, the initial processing processor 61 consecutively searches the outline characters while sequentially examining the character data of the character string in the character string data storage area 22. Then, the processor 61, when detecting the outline character, creates the scaling request order and outputs it to the next scaling processor 63.

Given next is an explanation of the scaling processing with reference to FIG. 14.

(S31) The scaling processor 63 checks whether or not a scaling processing request (order) shown in FIG. 9B reaches the FIFO memory 62.

(S32) The scaling processor 63, when the scaling order is reached, as illustrated in FIG. 9C, transmits heading data of the line width correction request order to the FIFO memory 64 of the next stage in the pipeline. This item of heading data consists of the line width correction request order code and the character management table pointer.

(S33) Next, the scaling processor 63 accesses the outline storage memory 3 with the outline address and thus reads the outline data. Then, the processor 63 multiplies each point-of-bend coordinate value of the outline data by the scaling factor, thus effecting the scaling.

(S34) The scaling processor 63, as illustrated in FIG. 9C, outputs the point-of-bend coordinate value subjected to the scaling to the FIFO memory 64 of the next stage in the pipeline.

(S35) The scaling processor 63 determines whether or not the final point-of-bend processing comes to an end from the outline data. If the final point-of-bend processing is not yet finished, the processing returns to step S33.

(S36) The scaling processor 63, when determining that the final point-of-bend scaling processing is finished, outputs the final data of the line width correction request to the FIFO memory 64 of the next stage in the pipeline. Then, the processing goes back to step S31.

Next, the line width correction processing will be explained referring to FIG. 15.

(S41) The correction processor 65 checks whether or not the line width correction processing request (order) shown in FIG. 9C reaches the FIFO memory 64.

(S42) The correction processor 65, when the line width correction request order is given, transmits heading data of the outline render request order as shown in FIG. 9D to the FIFO memory 66 of the next stage in the pipeline. This item of heading data composed of the outline render request order code and the character management table pointer.

(S43) The correction processor 65 checks whether or not the final data of the line width correction order is received. The processor 65 waits for receiving the final data if the final data is not received.

(S44) Next, the correction processor 65, on receiving the final data, accesses the outline memory 3 with a given correction data address and reads the correction data of the outline data. Then, the correction processor 65 line-width-corrects the given point-of-bend coordinate value on the basis of each item of correction data of the outline data.

(S45) Subsequently, the correction processor 65, as shown in FIG. 9D, outputs the point-of-bend coordinate value which has been line-width-corrected to the FIFO memory 66 of the next stage in the pipeline.

(S46) The correction processor 65 determines whether the final point-of-bend processing is finished or not. If the final point-of-bend processing is not finished, the processing returns to step S44.

(S47) The correction processor 65, when determining the final point-of-bend line width correction processing is finished, outputs the final data of the outline render request to the FIFO memory 66 of the next stage in the pipeline. Then, the processing goes back to step S41.

Next, the outline render processing will be described referring to FIG. 16.

(S51) The outline render processor 67 checks whether or not an outline render processing request (order) shown in FIG. 9D reaches the FIFO memory 66.

(S52) The outline render processor 67, when determining that the outline render request order is reached, as illustrated in FIG. 10A, transmits heading data of the filling request order to the FIFO memory 68 of the next stage in the pipeline. This item of heading data is defined as a filling request order code.

(S53) The outline render processor 67 checks whether or not the final data of the outline rendering order is received. If the final data is not yet received, the processor 67 waits for receiving the final data.

(S54) Next, the outline render processor 67, on receiving the final data, renders a line which connects a point of bend to a point of bend in the character storage area of the character storage memory 5 which is indicated by the pointer of the character management table.

(S55) The outline render processor 67 determines whether or not the final point-of-bend processing comes to an end. If the final point-of-bend processing is not yet finished, the processing returns to step S54.

(S56) The outline render processor 67, when determining that the final point-of-bend outline render processing is finished, outputs the final data of the filling request (character management table pointer) to the FIFO memory 68 of the next stage in the pipeline. Then, the processing returns to step S51.

Next, the fill processing will be explained with reference to FIG. 16.

(S61) The filling processor 69 checks whether or not a fill processing request (order) shown in FIG. 10A reaches the FIFO memory 68.

(S62) The filling processor 69, when the filling request order is given, accesses the character storage area of the character storage memory 5 which is indicated by the character management table pointer. Then, the processor 69 fills an area surrounded by the outline (vector).

(S63) Finally, the filling processor 69 sets ON a flag indicated by the character management table pointer of the character management table 20-2, thus effecting a change to the already-created status. Then, the processing returns to step S61.

In this way, the character patterns are consecutively formed by the pipeline circuit. Consequently, the processing of forming the character pattern can be speeded up.

Figure 18:
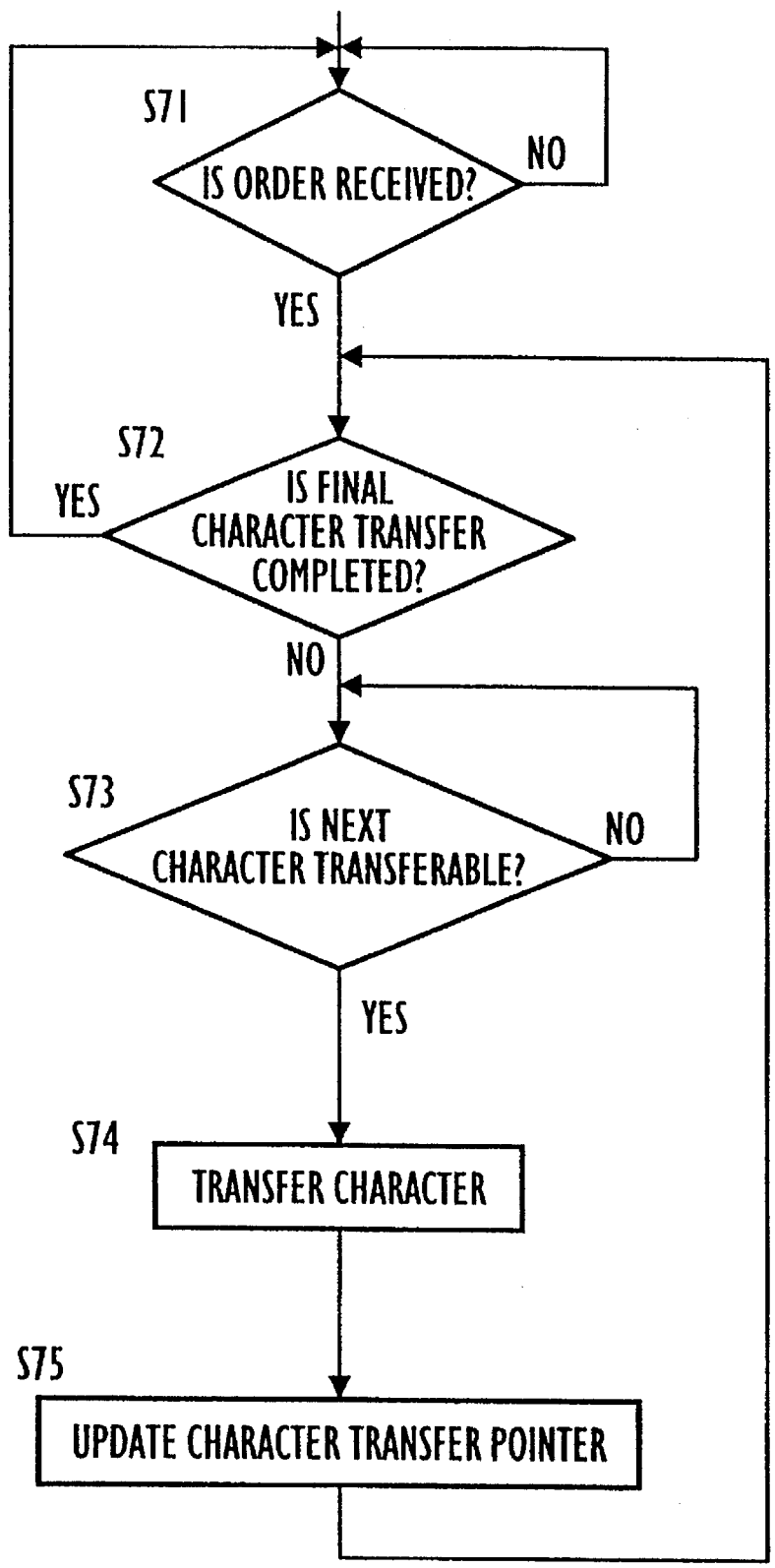
FIG. 18 is a flowchart showing transfer processing in the embodiment of FIG. 2.

FIG. 18 is a flowchart showing transfer processing executed by the character transfer circuit 7.

(S71) The character transfer processor 71 checks whether or not a transfer processing request (order) shown in FIG. 10B reaches the FIFO memory 70. The transfer processing request, as illustrated in FIG. 10B, consists of the character transfer request order code and the heading address of the character string data storage area.

(S72) The character transfer processor 71 determines whether or not the transfer of the last character is completed by examining a character transfer pointer of the character string data of the character string data storage area 22. When the last character transfer is completed, the processing goes back to step S71.

(S73) The character transfer processor 71, when determining that the transfer of the last character is not completed, reads the character data indicated by the character transfer pointer. Then, the processor 71 checks whether the character pattern, being in a character storage location of the character storage memory 5 which is indicated by the character management table pointer of that item of character data, is transferrable or not. Being transferrable is determined based on the already-created status or the not-yet-created status shown by the flag. If the flag indicates the not-yet-created status, the processor 71 waits till the character pattern is formed in the character storage memory 5 because of being on the formation due to the outline character.

(S74) Then, the character transfer processor 71 transfers the transferrable character pattern. That is, the character pattern in the character storage memory 5 which is indicated by the character management table pointer is transferred to the location, shown by the character string data, of the bitmap memory 4.

(S75) Next, the character transfer processor 71 updates the character transfer pointer of the character string data. Subsequently, the processing returns to step S72.

In this way, the character transfer circuit 7 determines whether the character is transferrable or not on the basis of the flag of the character management table. Then, if the character is transferrable, the character pattern in the location, indicated by the character management table, of the character storage memory is transferred to the bitmap memory 4. Whereas if not transferrable, the processor 71 waits till the character becomes transferrable. Then, when the character becomes transferrable, the character pattern in the location, indicated by the character management table, of the character storage memory is transferred to the bitmap memory 4.

Figure 19:
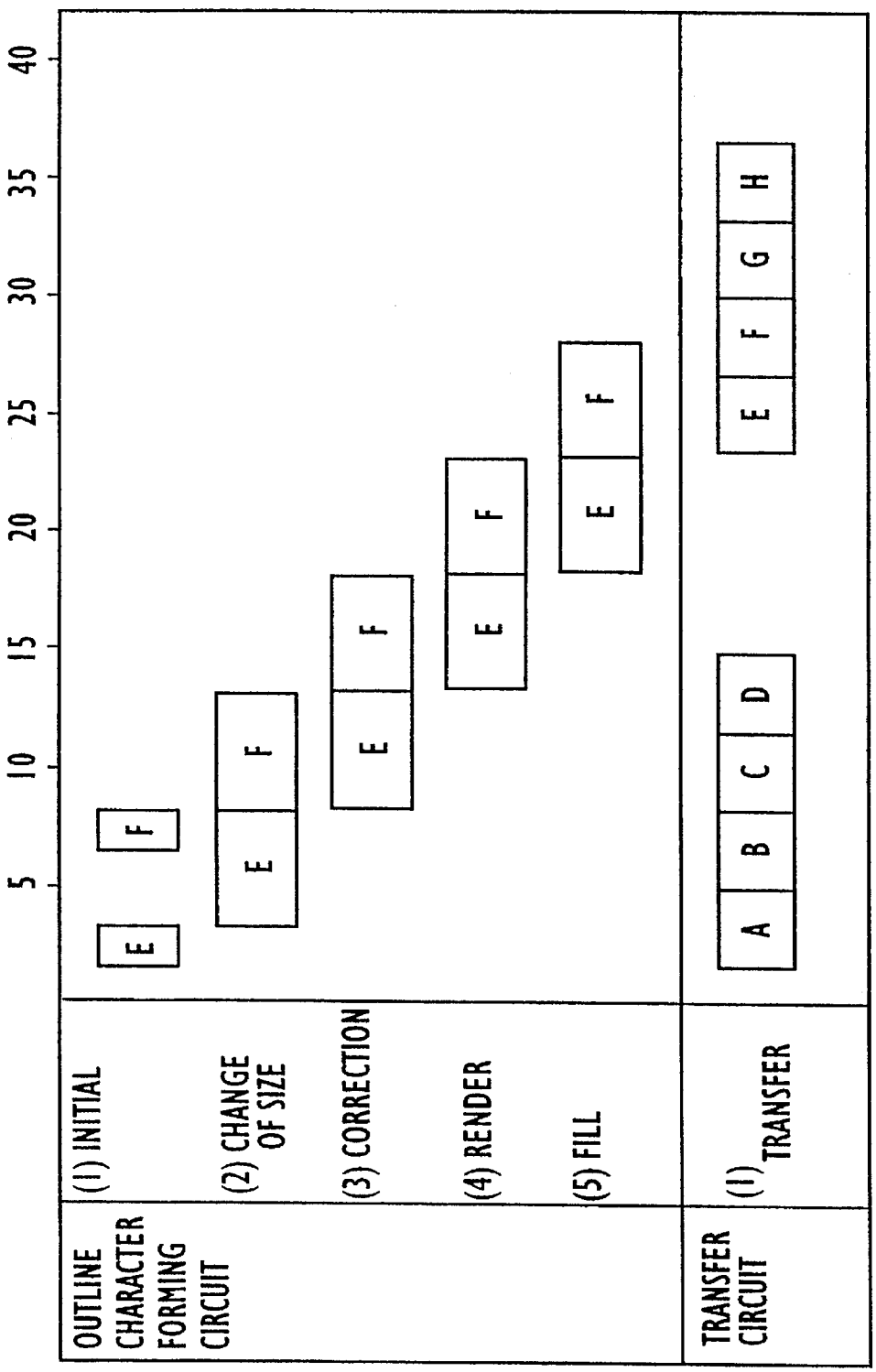
FIG. 19 is a time chart in one embodiment of the present invention.

FIG. 19 is a time chart in one embodiment of the present invention.

FIG. 19 illustrates an example, wherein the outline characters are a fifth character [E] and a sixth character [F] of the character string, other characters [A]–[D], [G], [H] are the raster characters or the cache already-registered characters (non-outline characters). The character transfer circuit 7 sequentially transfers the first through fourth characters of the character string data to the bitmap memory 4 from the character storage memory 3.

Simultaneously, the outline character forming circuit 6 searches the outline character from the character string. Then, the outline character forming circuit 6, on detecting the outline character, enters the formation of the outline character. This outline character forming circuit 6 consecutively detects and forms the outline character because of the pipeline format. In accordance with this embodiment, the fifth character [E] and the sixth character [F] in FIG. 19 are consecutively processed. Therefore, the characters are developed at a high speed.

On the other hand, the character transfer circuit 7 waits for forming the characters if the character is not transferrable because of being on the formation of the outline character. This is exemplified by the fifth character [E] in FIG. 19. Then, the character transfer circuit 7, immediately when the character becomes transferrable, transfers the character to the bitmap memory 4.

In this example, the character transfer circuit 7 and the outline character forming circuit 6 independently operate by use of the character transfer pointer and the outline creation pointer. This makes it possible to perform the character development processing at a higher speed.

Figure 20:
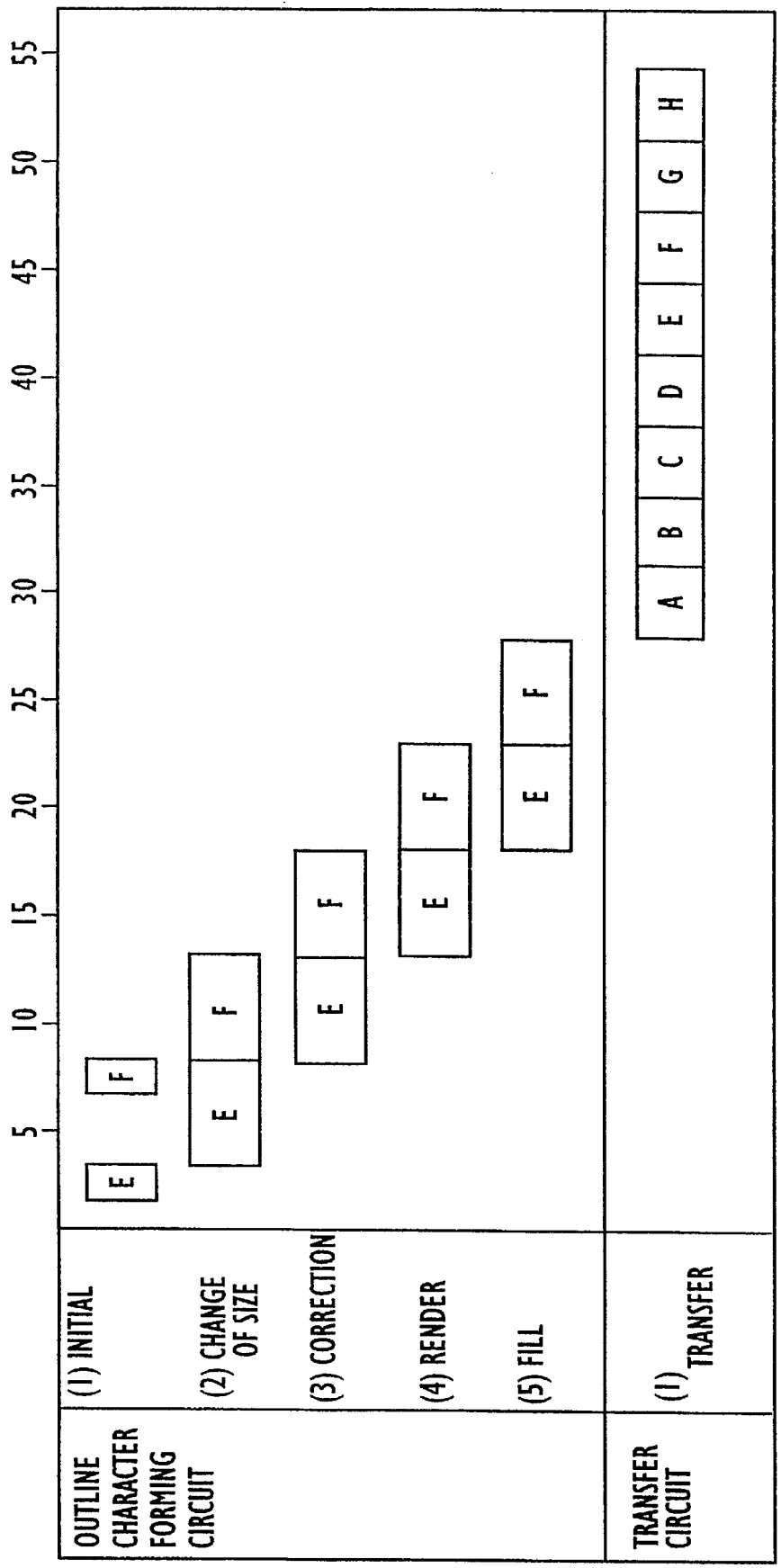
FIG. 20 is a time chart in a modified embodiment of the present invention.
Figure 21:
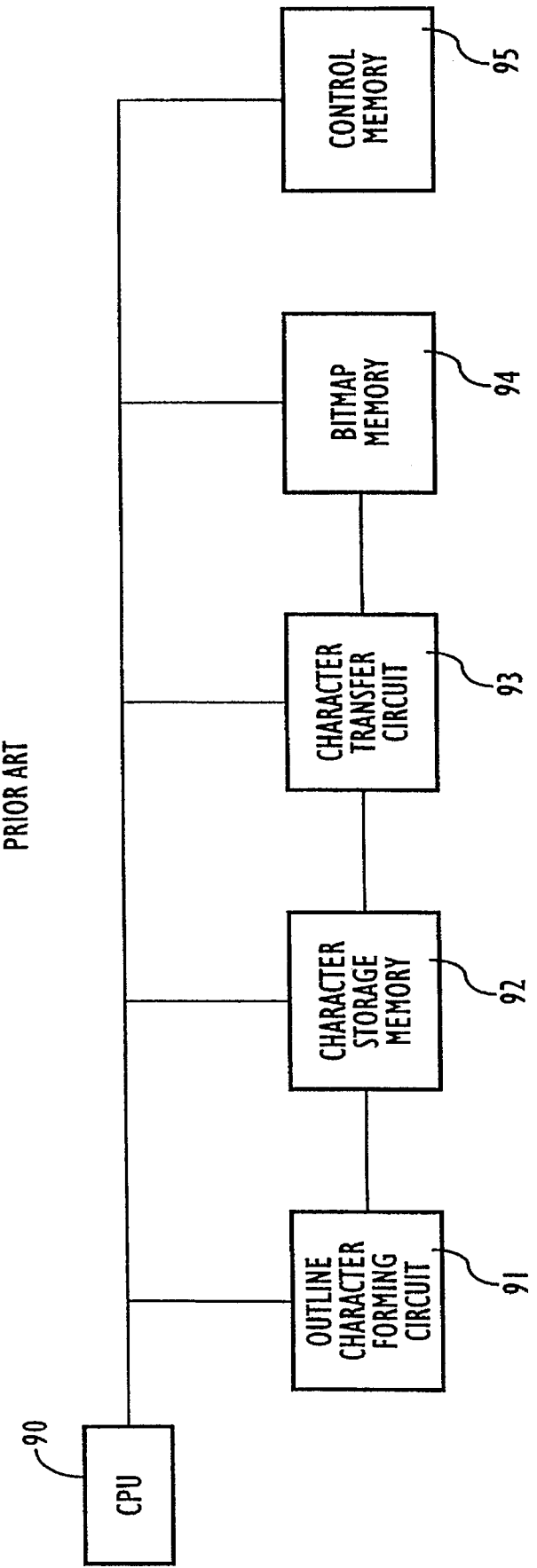
FIG. 21 is a diagram illustrating a construction of the prior art.
Figure 22:
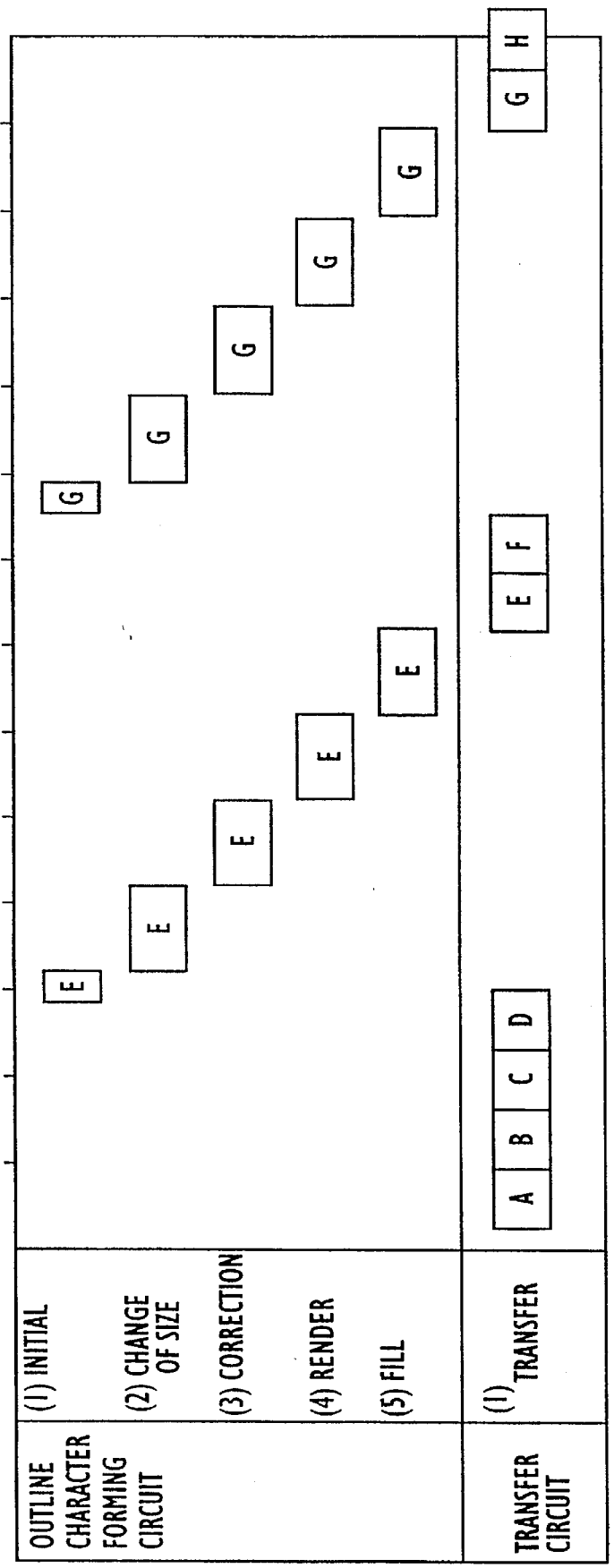
FIG. 22 is a time chart showing the prior art.

FIG. 20 is a time chart showing a modified example of the present invention.

Similarly in the example shown in FIG. 20, the fifth character [E] and the sixth character [F] of the character string are the outline characters, and other characters [A]–[D], [G] and [H] are the raster characters and the cache already-registered characters.

In this example, first, the outline character forming circuit 6 is started up to search the outline character from the character string. Then, the outline character forming circuit 6, when detecting the outline character, enters the formation of the outline character. This outline character forming circuit 6 consecutively detects and forms the outline character because of the pipeline format. The fifth character [E] and the sixth character [F] in FIG. 19 are consecutively processed. Therefore, the characters are formed at the high speed.

On the other hand, the character transfer circuit 7 is actuated corresponding to the end of the character development processing by the outline character forming circuit 6. Accordingly, the character transfer circuit 7 sequentially transfers the first through eighth characters of the character string data to the bitmap memory 4.

The character development processing can be speeded up in this way also. The outline character forming circuit 6 and the character transfer circuit 7 operate in sequence in this instance.

In addition to the embodiments discussed above, the present invention is modifiable as follows. First, the outline character forming circuit is constructed of the five processors but may be constructed of other numbers of processors on condition that two or more processors are employed. Second, other correction processing or the like may be added to the outline character formation processing.

The present invention has been discussed so far by way of the embodiments but may be modifiable in many forms within the range of the gist of the present invention. These modifications are not excluded from the scope of the present invention.

As discussed above, according to the present invention, the outline character forming circuit extracts only the outline characters and consecutively batch-processes these characters. Hence, the characters in the character string can be created at the high speed. Further, the outline characters are batch-processed consecutively, and, therefore, it is possible to effectively make use of the pipeline circuit capable of performing the batch-processing.

What is claimed is:

1. A character developing apparatus for converting a character code in a character string into a character pattern and then developing the character pattern on a bitmap memory, said apparatus comprising:

a character storage memory for storing the character pattern;

a character transfer circuit for selecting the character pattern corresponding to the character code from said character storage memory and transferring the selected character pattern to said bitmap memory;

an outline memory for storing outline data of a character;

a control circuit for determining whether the character code of the character string is an outline character, which is required to form the character pattern, or non-outline character, of which the character pattern is already formed and stored in the character storage memory, and creating character string data including information that the character code is the outline character in accordance with said determination; and a character forming circuit for executing outline character extraction processing of consecutively extracting the outline character from information of the character string data and character formation processing of consecutively forming the character pattern of the outline character in said character storage memory using the outline data in said outline memory, wherein said character forming circuit includes a plurality of pipeline connected processing circuits respectively taking charge of a plurality of divided processes including the character extracting processing and the character forming processing, and wherein said control circuit simultaneously starts up said character transfer circuit and said character forming circuit.

2. A character developing apparatus according to claim 1, wherein said character forming circuit includes:

a first processing circuit for consecutively extracting the outline character from the character code and consecutively issuing a character forming request to a second processing circuit; and the second processing circuit for consecutively executing the character forming processing in accordance with the character forming request.

3. A character developing apparatus according to claim 2, wherein said second processing circuit is constructed of a plurality of processing circuits each taking charge of the divided character forming processing.

4. A character developing apparatus according to claim 2, further comprising a buffer circuit for connecting said first processing circuit and said second processing circuit to each other and holding the character forming request.

5. A character developing apparatus according to claim 4, wherein said second processing circuit includes:

a plurality of processing circuits each taking charge of the divided character formation processing; and a buffer circuit for connecting said plurality of processing circuits and holding a request for the processing of which a respective processing circuit takes charge.

6. A character developing apparatus for converting a character code in a character string into a character pattern and then developing the character pattern on a bitmap memory, said apparatus comprising:

a character storage memory for storing the character pattern;

a character transfer circuit for selecting the character pattern corresponding to one character code from said character storage memory and transferring the selected character pattern to said bitmap memory;

an outline memory for storing outline data of a character;

a control circuit for determining whether the character code of the character string is an outline character, which is required to form the character pattern, or a non-outline character, of which the character pattern is already formed and stored in the character storage memory, and creating character string data including information that the character code is the outline character in accordance with said determination; and a character forming circuit for executing outline character extraction processing of consecutively extracting the outline character from information of the character string data and character formation processing of consecutively forming the character pattern of the outline character in said character storage memory using the outline data in said outline memory, wherein said character forming circuit includes a plurality of pipeline-connected processing circuits respectively taking charge of a plurality of divided processes including the character extracting processing and the character forming processing, and wherein said control circuit, after starting up said character forming circuit, starts up said character transfer circuit corresponding to an end of the formation processing of all outline characters of the character string.

7. A character developing apparatus according to claim 6, further comprising a common memory for storing the created character string data, wherein said character transfer circuit and said character forming circuit perform the processing referring to the character string data in said common memory.

* * * * *